(12) United States Patent
Tsukahara et al.

(10) Patent No.: US 8,973,726 B2
(45) Date of Patent: Mar. 10, 2015

(54) HYDRAULIC SHOCK ABSORBER

(71) Applicant: Showa Corporation, Gyoda-shi (JP)

(72) Inventors: Takashi Tsukahara, Gyoda (JP);
Noriaki Maneyama, Gyoda (JP)

(73) Assignee: Showa Corporation, Gyoda-Shi (JP)

( * ) Notice: Subject to any disclaimer, the term of this patent is extended or adjusted under 35 U.S.C. 154(b) by 35 days.

(21) Appl. No.: 13/750,182

(22) Filed: Jan. 25, 2013

(65) Prior Publication Data

US 2013/0313057 A1 Nov. 28, 2013

(30) Foreign Application Priority Data

May 23, 2012 (JP) ................................ 2012-117192

(51) Int. Cl.
| | | |
|---|---|---|
| F16F 9/00 | (2006.01) | |
| F16F 9/34 | (2006.01) | |
| F16F 9/19 | (2006.01) | |
| F16F 9/348 | (2006.01) | |
| F16F 9/18 | (2006.01) | |

(52) U.S. Cl.
CPC . *F16F 9/19* (2013.01); *F16F 9/348* (2013.01); *F16F 9/185* (2013.01)
USPC ..................................... 188/315; 188/322.14

(58) Field of Classification Search
CPC ........... F16F 9/466; F16F 9/348; F16F 9/325; F16F 9/34
USPC ........................ 188/313–316, 322.13, 322.14
See application file for complete search history.

(56) References Cited

U.S. PATENT DOCUMENTS

| | | | | |
|---|---|---|---|---|
| 2,500,708 | A | | 3/1950 | Rossman |
| 4,325,468 | A | * | 4/1982 | Siorek .......................... 188/282.8 |
| 4,423,801 | A | * | 1/1984 | Miura ........................ 188/322.14 |
| 4,460,073 | A | * | 7/1984 | Smeltzer ................... 188/322.13 |
| 4,561,524 | A | * | 12/1985 | Mizumukai et al. ........ 188/282.4 |
| 4,768,629 | A | | 9/1988 | Wössner |
| 4,971,180 | A | * | 11/1990 | Kobayashi et al. .......... 188/282.4 |
| 5,259,487 | A | * | 11/1993 | Petek .......................... 188/267.1 |
| 8,066,105 | B2 | | 11/2011 | Maniowski et al. |
| 2009/0032120 | A1 | | 2/2009 | Sugai et al. |
| 2010/0326780 | A1 | * | 12/2010 | Murakami ................ 188/322.13 |
| 2011/0290603 | A1 | * | 12/2011 | Yabe ........................... 188/282.1 |
| 2013/0081912 | A1 | | 4/2013 | Murakami |

FOREIGN PATENT DOCUMENTS

| | | | |
|---|---|---|---|
| EP | 2584215 | * | 4/2013 |
| JP | 07-139573 A | | 5/1995 |
| JP | 2012-26564 A | | 2/2012 |
| WO | WO 2011161990 | * | 12/2011 |

\* cited by examiner

*Primary Examiner* — Vishal Sahni
(74) *Attorney, Agent, or Firm* — Leason Ellis LLP

(57) ABSTRACT

A hydraulic shock absorber includes: a cylinder which demarcates a piston oil chamber and a rod oil chamber; an outer cylinder body which demarcates between the cylinder and the outer cylinder body a reflux path that connects the piston oil chamber and the rod oil chamber with each other and which demarcates between a damper case and the outer cylinder body a reservoir chamber; and a valve structure mounted to the cylinder and the outer cylinder body. The valve structure has a valve for controlling an oil flow between the piston oil chamber and the reflux path and between the piston oil chamber and the reservoir chamber. The valve structure comprises a first valve structure mounted to an open end of the cylinder and a second valve structure mounted to an open end of the outer cylinder body. A cylinder assembly and an outer cylinder assembly are independently arranged.

13 Claims, 13 Drawing Sheets

HYDRAULIC SHOCK ABSORBER

CROSS-REFERENCE TO RELATED PATENT APPLICATIONS

This application claims the benefit of Japanese Patent Application No. 2012-117192, filed May 23, 2012, which is incorporated by reference herein.

FIELD OF THE INVENTION

The present invention relates to a hydraulic shock absorber.

BACKGROUND OF THE INVENTION

Japanese Patent Application Laid-open No. 2012-26564 describes one conventional example of a hydraulic shock absorber which includes, inside a cylindrical damper case: a cylinder which demarcates a piston oil chamber and a rod oil chamber so as to sandwich a piston; an outer cylinder body which is arranged outside the cylinder, which demarcates between the cylinder and the outer cylinder body a reflux path that connects the piston oil chamber and the rod oil chamber with each other, and which demarcates between the damper case and the outer cylinder body a reservoir chamber that compensates for oil corresponding to tension and compression of a piston rod; and a valve structure which is mounted to each open end of the cylinder and the outer cylinder body on the side of the piston oil chamber and which is provided with a valve for controlling a flow of oil between the piston oil chamber and the reflux path and between the piston oil chamber and the reservoir chamber.

The valve structure described in Japanese Patent Application Laid-open No. 2012-26564 is constituted by a first base piston and a second base piston, and the base pistons are overlaid on each other and integrated by a bolt. The respective open ends of the cylinder (an inner cylinder described in Japanese Patent Application Laid-open No. 2012-26564) and the outer cylinder body (an outer cylinder described in Japanese Patent Application Laid-open No. 2012-26564) are both fixed to the integrated base pistons by press-fitting.

With a structure in which a cylinder and an outer cylinder body are concentrically mounted to a valve structure as is the case with the hydraulic shock absorber described in Japanese Patent Application Laid-open No. 2012-26564, if the outer cylinder body is first press-fitted into the valve structure, the degree of press-fitting of a press-fit portion of the subsequent cylinder cannot be visually observed. Therefore, when mounting the cylinder and the outer cylinder body to the valve structure, two press-fitting steps are conceivably adopted in which the inner cylinder is first press-fitted and the outer cylinder body is subsequently press-fitted. However, since the cylinder and the outer cylinder body are elongated parts, there is a problem with an operation of further overlaying the outer cylinder body from the outside to the valve structure to which the cylinder has already been mounted in that handling of the parts is troublesome and work efficiency is likely to decline.

A specialized jig can conceivably be used to press-fit the cylinder and the outer cylinder body at the same time. However, in this case, since a press-fit portion of the cylinder cannot be visually observed as described earlier, a need arises to use a dedicated assembly machine with high press-fitting management accuracy.

SUMMARY OF THE INVENTION

The present invention has been made in order to solve such problems, and an object thereof is to provide a hydraulic shock absorber in which a cylinder and an outer cylinder body mounted to a valve structure are concentrically arranged inside a damper case and which enables simplification of an assembly process.

In order to solve the problem described above, the present invention provides a hydraulic shock absorber which includes, inside a cylindrical damper case: a cylinder which demarcates a piston oil chamber and a rod oil chamber so as to sandwich a piston; an outer cylinder body which is arranged outside the cylinder, which demarcates between the cylinder and the outer cylinder body a reflux path that connects the piston oil chamber and the rod oil chamber with each other, and which demarcates between the damper case and the outer cylinder body a reservoir chamber that compensates for oil corresponding to tension and compression of a piston rod; and a valve structure which is mounted to each open end of the cylinder and the outer cylinder body on the side of the piston oil chamber and which is provided with a valve for controlling a flow of oil between the piston oil chamber and the reflux path and between the piston oil chamber and the reservoir chamber, wherein the valve structure is constituted by a first valve structure to be mounted to the open end of the cylinder and a second valve structure to be mounted to the open end of the outer cylinder body, and a cylinder assembly constituted by the cylinder and the first valve structure and an outer cylinder assembly constituted by the outer cylinder body and the second valve structure are independent of each other.

In the present invention, "a cylinder assembly and an outer cylinder assembly being independent of each other" means that the cylinder assembly and the outer cylinder assembly are arranged between the first valve structure and the second valve structure without having means that directly couples the two assemblies with each other.

According to the present invention, compared to a structure in which a cylinder and an outer cylinder body are mounted to a single valve structure, the cylinder assembly and the outer cylinder assembly can be readily assembled. In doing so, a state of a mounting portion of the cylinder and the first valve structure can be readily comprehended by visual observation, and a state of a mounting portion of the outer cylinder body and the second valve structure can be readily comprehended by visual observation. In addition, by adopting a structure in which the cylinder assembly is inserted into the outer cylinder assembly, an overall assembly constituted by the cylinder, the outer cylinder body, and the valve structure can be readily constructed. Furthermore, since the cylinder assembly and the outer cylinder assembly are provided independent of each other, freedom of design of both assemblies is increased, and a highly versatile hydraulic shock absorber can be realized by, for example, adopting a common specification for one of the assemblies.

In addition, in the present invention, the piston includes a tension stroke damping valve, the first valve structure includes a compression stroke damping valve and a tension stroke check valve, and the second valve structure includes a compression stroke check valve.

According to the present invention, since a tension stroke damping valve is provided at the piston, an amount of oil that passes through the tension stroke check valve during a tension stroke corresponds only to an exit volume of the piston rod and the tension stroke check valve can be set to a small size.

Furthermore, in the present invention, the first valve structure includes a compression stroke damping valve and a tension stroke check valve, and the second valve structure includes a tension stroke damping valve and a compression stroke check valve.

According to the present invention, since a damping valve and a check valve can be aggregated on the valve structure without having to provide a damping valve on the piston, a hydraulic shock absorber with a simple structure can be realized.

In addition, in the present invention, a valve communicating chamber is formed between the first valve structure and the second valve structure, the second valve structure includes a base portion that is fitted to the open end of the outer cylinder body, a cylindrical protruding portion which protrudes from the base portion to the valve communicating chamber and which includes therein a connecting hole that connects the valve communicating chamber and the reservoir chamber with each other, and an annular cylinder supporting plate portion which extends radially outward from the cylindrical protruding portion and the outer edge of which butts against an uneven surface of an inner circumference of the first valve structure in an axial direction, wherein the compression stroke check valve is constituted by a valve hole which is formed so as to penetrate the cylinder supporting plate portion, and an annular valve seat which is supported by the cylindrical protruding portion and which opens and closes the valve hole.

According to the present invention, by constituting the compression stroke check valve by a valve hole which is formed so as to penetrate the cylinder supporting plate portion, and an annular valve seat which is supported by the cylindrical protruding portion and which opens and closes the valve hole, the structure of the compression stroke check valve can be simplified.

Furthermore, in the present invention, an outer circumference of the first valve structure abuts an inner circumference of the outer cylinder body between the open end of the cylinder and the open end of the outer cylinder body, to concentrically position a periphery of the open end of the cylinder relative to the outer cylinder body.

Compared to the technique described in Japanese Patent Application Laid-open No. 2012-26564 involving a structure in which a seal member is required in the first valve structure, in the present invention, an outer circumference of the first valve structure abuts an inner circumference of the outer cylinder body between the open end of the cylinder and the open end of the outer cylinder body or, in other words, midway along the reflux path. Therefore, no seal member for sealing the abutting portion is required on the outer circumference of the first valve structure. Accordingly, the periphery of the open end of the cylinder can be concentrically positioned relative to the outer cylinder body with a simple structure.

According to the present invention, simplification of an assembly process can be achieved in a hydraulic shock absorber in which a cylinder and an outer cylinder body are concentrically arranged inside a damper case.

DETAILED DESCRIPTION OF THE INVENTION

First Embodiment

Figure 1:
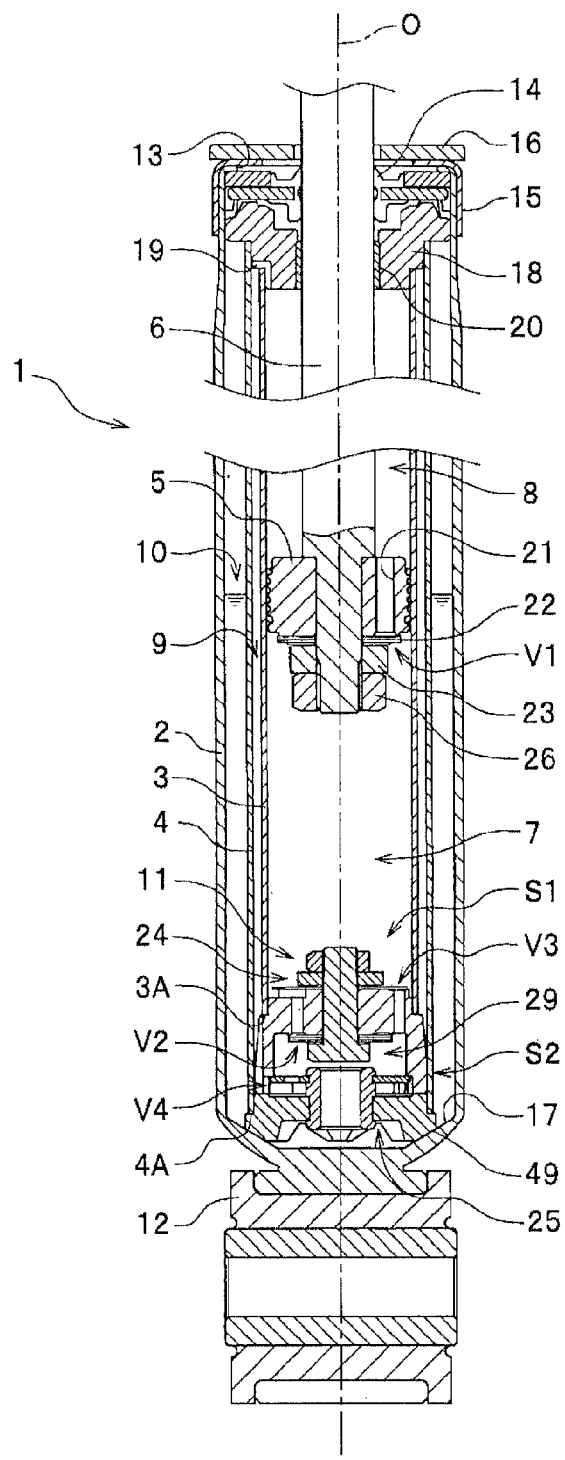
FIG. 1 is a sectional view of a hydraulic shock absorber according to a first embodiment of the present invention.

In FIG. 1, a hydraulic shock absorber 1 includes: a cylindrical damper case 2; a cylinder 3 which is concentrically arranged with the damper case 2 in the damper case 2 and which demarcates a piston oil chamber 7 and a rod oil chamber 8 so as to sandwich a piston 5; an outer cylinder body 4 which is concentrically arranged with the damper case 2 outside the cylinder 3 in the damper case 2, which demarcates between the cylinder 3 and the outer cylinder body 4 a reflux path 9 that connects the piston oil chamber 7 and the rod oil chamber 8 with each other, and which demarcates between the damper case 2 and the outer cylinder body 4 a reservoir chamber 10 that compensates for oil corresponding to tension and compression of a piston rod 6; and a valve structure 11 which is mounted to respective open ends 3A and 4A of the cylinder 3 and the outer cylinder body 4 on the side of the piston oil chamber 7 and which is provided with a valve for controlling a flow of oil between the piston oil chamber 7 and the reflux path 9 and between the piston oil chamber 7 and the reservoir chamber 10.

"Damper Case 2"

The damper case 2 is constituted by a lidless and bottomed cylindrical chassis formed so as to be opened only on, for example, a side of one axial end (an upper end side), and a coupling portion 12 that is coupled to a wheel side is mounted on a side of another axial end (a lower end side). The piston rod 6 that is coupled to a vehicle body side is inserted through an opening portion 13 formed on the side of the one axial end. An oil seal 14 which seals a circumferential surface of the piston rod 6 is provided inside the damper case 2 around the opening portion 13, and end caps 15 and 16 are fitted to the outside of the damper case 2 around the opening portion 13 by swaging or the like. An annular inclined surface 17 which decreases in diameter the further outward with respect to the other axial end is formed around a shaft center O of the piston 5 on an inner surface on the side of the other axial end of the damper case 2, and when a cylinder assembly S1 and an outer cylinder assembly S2 are built into the damper case 2 as will be described later, an inclined surface 49 of a second valve structure 25 is guided by an inclined surface 17 to concentrically position the periphery of other axial ends of the outer cylinder body 4 and the cylinder 3 relative to the damper case 2.

"Cylinder 3"

The cylinder 3 is constituted by a cylindrical member formed so as to be opened at both axial ends, and an open end on the side of one axial end is fixed by press-fitting or the like to a small-diameter portion of a ring-like rod guide 18 provided in the damper case 2. An internal space of the cylinder 3 is demarcated by the piston 5 into the piston oil chamber 7 positioned on the side of the other axial end and the rod oil chamber 8 which is positioned on the side of the one axial end, wherein the piston rod 6 passes through a center of the rod oil chamber 8. A notched flow channel 19 which connects the rod oil chamber 8 and the reflux path 9 with each other is formed at a part of an outer circumferential surface of the rod guide 18 to which an open end of the cylinder 3 is fixed. The open end on the side of the other axial end of the cylinder 3 or, in other words, an open end 3A on the side of the piston oil chamber 7 is fixed to a first valve structure 24 constituting the valve structure 11. Moreover, a bush 20 is interposed between an inner circumference of the rod guide 18 and an outer circumference of the piston rod 6.

"Outer Cylinder Body 4"

The outer cylinder body 4 is constituted by a cylindrical member formed so as to be opened at both axial ends. An open end on the side of one axial end is fixed by press-fitting or the like to an middle-diameter portion of the rod guide 18, and an open end on the side of the other axial end or, in other words, an open end 4A on the side of the piston oil chamber 7 is fixed to the second valve structure 25 constituting the valve structure 11. The open end 4A is positioned further downward than the open end 3A of the cylinder 3.

"Piston 5"

The piston 5 is a ring-shaped member which is externally fitted to a small-diameter portion on a tip of the piston rod 6 and which is fixed to the piston rod 6 by a nut 26. In the present embodiment as well as in second and third embodiments to be described later, a tension stroke damping valve V1 is provided on the piston 5. The tension stroke damping valve V1 is a throttle valve that throttles a flow of oil from the rod oil chamber 8 to the piston oil chamber 7, and is constituted by a valve hole 21 which is formed so as to penetrate the piston 5 along the shaft center O and which connects the piston oil chamber 7 and the rod oil chamber 8 with each other and a plurality of annular valve seats 22 which is supported by the small-diameter portion of the piston rod 6 in the piston oil chamber 7 and which opens and closes the valve hole 21. Reference numeral 23 denotes a valve stopper which is mounted to the small-diameter portion of the piston rod 6 and which restricts a degree of opening of the valve seats 22.

"Valve Structure 11"

Figure 2:
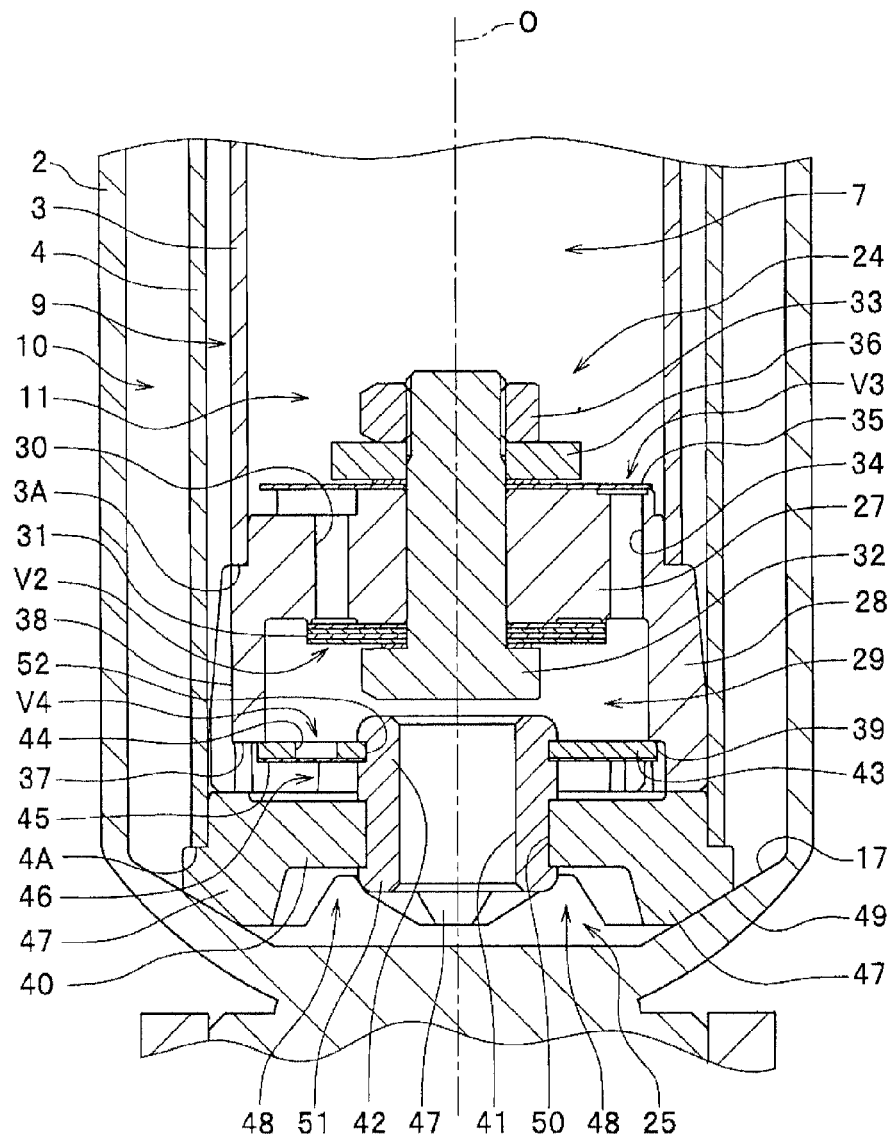
FIG. 2 is an enlarged sectional view of a periphery of a valve structure in FIG. 1.

As shown enlarged in FIG. 2, the valve structure is constituted by the first valve structure 24 to be mounted to the open end 3A of the cylinder 3 and the second valve structure 25 to be mounted to the open end 4A of the outer cylinder body 4.

"First Valve Structure 24"

The first valve structure 24 is constituted by a shape having a disk-like base portion 27 which is press-fitted into an inner circumference of the open end 3A of the cylinder 3 so as to block the open end 3A with the exception of a valve portion and an approximately cylindrical skirt portion 28 which is provided so as to extend from an outer circumferential edge of the base portion 27 toward the side of the other axial end and the outer diameter of which is formed larger than the base portion 27. An internal space of the skirt portion 28 constitutes a valve communicating chamber 29 which is formed between the first valve structure 24 and the second valve structure 25.

A compression stroke damping valve V2 and a tension stroke check valve V3 are provided on the first valve structure 24. The compression stroke damping valve V2 is a throttle valve that throttles a flow of oil from the piston oil chamber 7 to the valve communicating chamber 29, and is constituted by a valve hole 30 which is formed so as to penetrate the base portion 27 along the shaft center O and which connects the piston oil chamber 7 and the valve communicating chamber 29 with each other and a plurality of annular valve seats 31 which is supported by a shaft portion of a bolt 32 in the valve communicating chamber 29 and which opens and closes the valve hole 30. The bolt 32 penetrates a bolt-through hole formed at center of the base portion 27 and is fixed to the base portion by a nut 33. A head portion of the bolt 32 is positioned below and restricts a degree of opening of the valve seats 31.

The tension stroke check valve V3 is a valve that only allows a flow of oil from the valve communicating chamber 29 to the piston oil chamber 7, and is constituted by a valve hole 34 which is formed so as to penetrate the base portion 27 along the shaft center and which connects the piston oil chamber 7 and the valve communicating chamber 29 with each other and annular valve seats 35 which is supported by a shaft portion of the bolt 32 in the piston oil chamber 7 and which opens and closes the valve hole 34. Reference numeral 36 denotes a valve stopper which is mounted to the shaft portion of the bolt 32 and which restricts a degree of opening of the valve seats 35.

Figure 3:
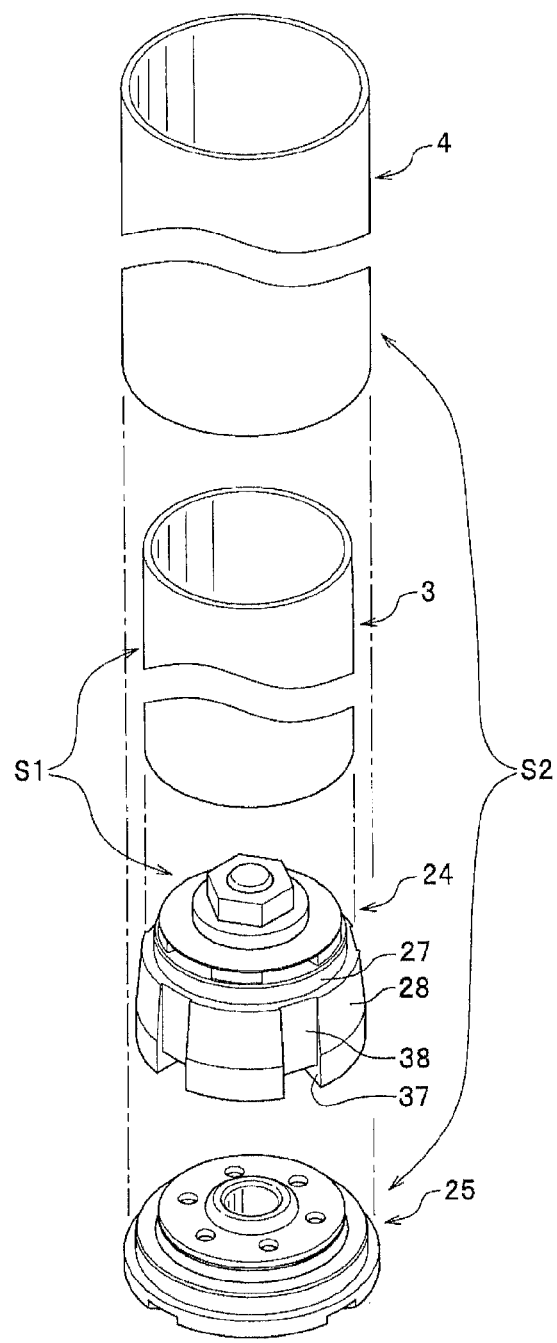
FIG. 3 is an external perspective view of a cylinder, an outer cylinder body, a first valve structure, and a second valve structure according to the first embodiment of the present invention.

As is apparent from FIG. 3, in the skirt portion 28, a hem portion thereof is formed in alternating concave and convex shapes in a circumferential direction, and a groove 38 extending in an axial direction is formed on an outer circumference of the skirt portion 28 so as to connect to respective notched opening portions 37 formed at the concave shapes. Since a structure is adopted in which an outer circumference of the hem portion of the skirt portion 28 almost abuts an inner circumference of the outer cylinder body 4, the groove 38 bears the function of connecting the valve communicating chamber 29 and the reflux path 9 with each other via the notched opening portion 37. In addition, an inner circumferential side of the hem portion of the skirt portion 28 is notched in an annular pattern and has thin walls, and an annular uneven surface 39 which is centered around the shaft center O and which is oriented in a radial direction is formed between the thin-walled portion and a thick-walled portion.

"Second Valve Structure 25"

The second valve structure 25 is constituted by a shape having a disk-like base portion 40 which is press-fitted into an inner circumference of the open end 4A of the outer cylinder body 4 so as to block the open end 4A with the exception of a valve portion, a cylindrical protruding portion 42 which protrudes from the base portion 40 to the valve communicating chamber 29 and which includes therein a connecting hole 41 that connects the valve communicating chamber 29 and the reservoir chamber 10 with each other, and an annular cylinder supporting plate portion 43 which is provided so as to extend radially outward from the cylindrical protruding portion 42 and the outer edge of which butts against the uneven surface 39 of the first valve structure 24 in an axial direction.

Figure 4:
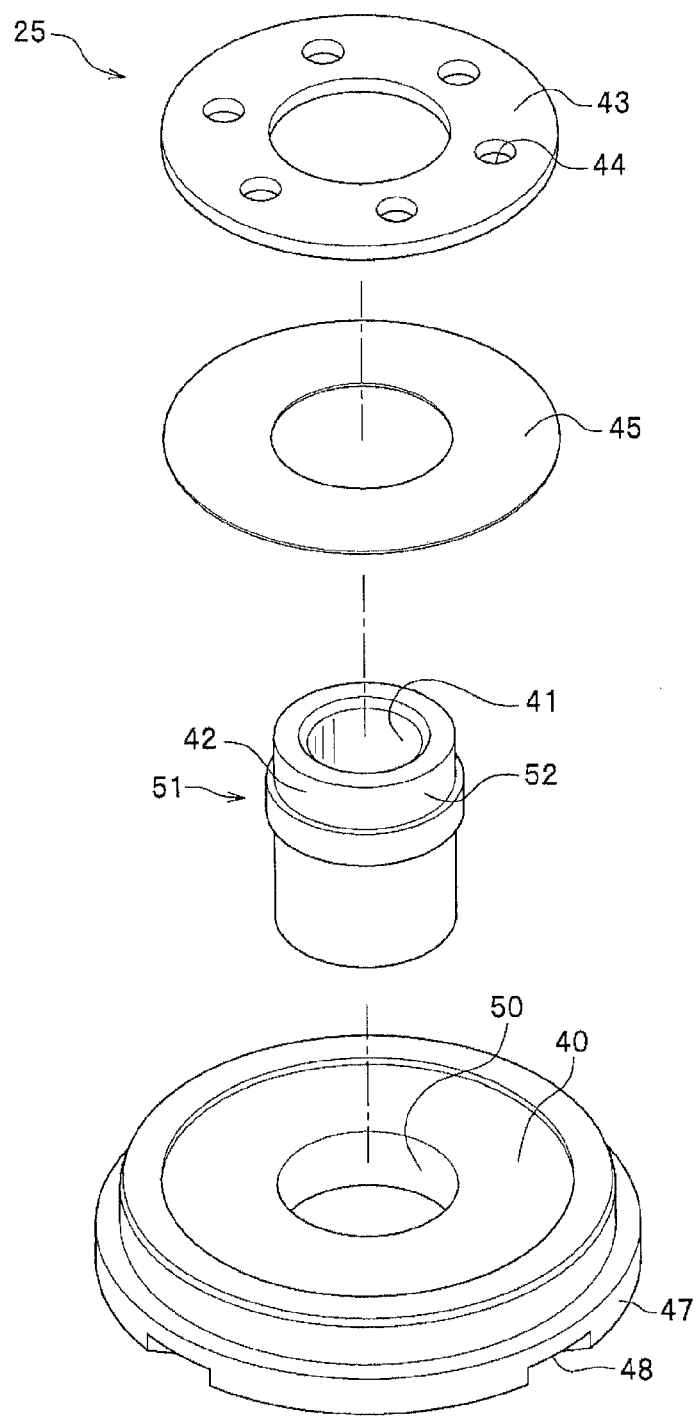
FIG. 4 is an exploded perspective view of a second valve structure according to the first embodiment of the present invention.

A compression stroke check valve V4 is provided on the second valve structure 25. The compression stroke check valve V4 is a valve which allows only a flow of oil from the valve communicating chamber 29 to the reflux path 9, and is constituted by a valve hole 44 formed so as to penetrate the cylinder supporting plate portion 43 along the shaft center O and an annular valve seat 45 which is supported by the cylindrical protruding portion 42 and which opens and closes the valve hole 44. As shown in FIG. 4, a plurality of the valve holes 44 is provided in the cylinder supporting plate portion 43 at intervals in the circumferential direction.

Due to the cylinder supporting plate portion 43 butting against the uneven surface 39 of the skirt portion 28 of the first valve structure 24, the valve communicating chamber 29 is demarcated by being surrounded by the skirt portion 28 and the cylinder supporting plate portion 43. The cylinder supporting plate portion 43 is arranged at an interval relative to the base portion 40 and a connecting flow channel 46 is formed between the cylinder supporting plate portion 43 and the base portion 40. In addition, a lower end of the hem portion of the skirt portion 28 butts against the base portion 40. Therefore, the valve communicating chamber 29 and the reflux path 9 communicate with each other via the valve hole 44, the connecting flow channel 46, the notched opening portion 37, and the groove 38. Protruding portions 47 are formed at intervals in a circumferential direction on an outer edge of a lower end of the base portion 40, and flow channels 48 formed between the protruding portions 47 connect the connecting hole 41 and the reservoir chamber 10 with each other. As described earlier, an inclined surface 49 which comes into contact with the inclined surface 17 of the damper case 2 is formed at lower ends of the protruding portions 47.

In the present embodiment, as shown in FIG. 4, the base portion 40, the cylindrical protruding portion 42, and the cylinder supporting plate portion 43 are provided as three members independently manufactured of each other and are integrated by assembly. In FIGS. 2 and 4, a through hole 50 is formed at center of the base portion 40, a lower portion of a cylindrical shaft 51 is inserted into the through hole 50, and a lower end of the cylindrical shaft 51 is fixed to a lower surface of the base portion 40 by riveting or the like. An upper portion of the cylindrical shaft 51 constitutes the cylindrical protruding portion 42. In addition, an outer circumferential surface of an upper end of the cylindrical shaft 51 is formed as a small-diameter portion 52, respective through holes of the valve seats 45 and the cylinder supporting plate portion 43 are passed through the small-diameter portion 52, and the upper end of the cylindrical shaft 51 is fixed to an upper surface of the cylinder supporting plate portion 43 by riveting or the like.

"Operation"

Figure 11:
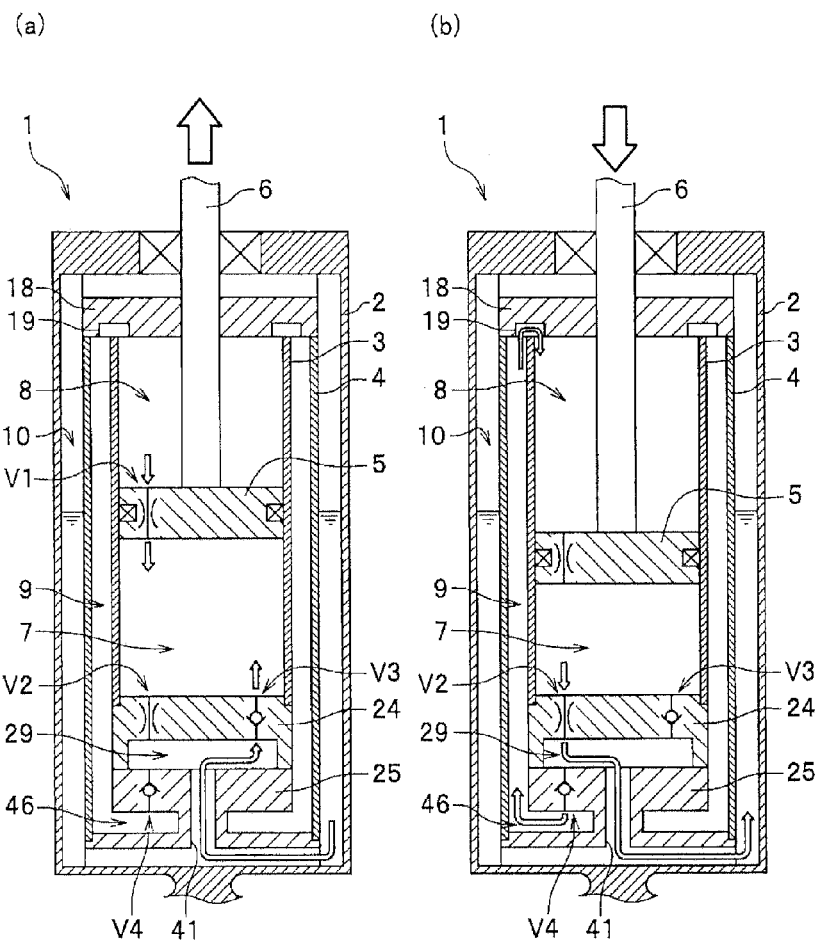
FIG. 11 is a simplified view of a structure of a hydraulic shock absorber according to the first to third embodiments showing respective valves encoded, in which FIGS. 11A and 11B respectively show a flow of oil during a tension stroke and a compression stroke.

An operation of the hydraulic shock absorber 1 configured as described above will now be described. FIG. 11 is a simplified view of a structure of the hydraulic shock absorber 1 showing respective valves encoded, in which FIGS. 11A and 11B respectively show a flow of oil during a tension stroke and a compression stroke. The following description will be given with reference to FIGS. 1, 2, and 11 as appropriate.

"Tension Stroke"

In FIGS. 1, 2, and 11A, as the piston 5 moves upward and oil inside the rod oil chamber 8 is pressurized, the oil inside the rod oil chamber 8 passes through the valve hole 21, pushes open the valve seat 22, and flows into the piston oil chamber 7. In other words, the oil passes through the tension stroke damping valve V1 and, accordingly, a tension side damping force is generated in the hydraulic shock absorber 1. Oil corresponding to an exit volume of the piston rod 6 is compensated by being supplied from the reservoir chamber 10 to the piston oil chamber 7 via the connecting hole 41, the valve communicating chamber 29, and the tension stroke check valve V3. Due to the presence of the compression stroke check valve V4, a flow of oil from the reflux path 9 to the valve communicating chamber 29 does not occur. Since an amount of oil passing through tension stroke check valve V3 exactly corresponds to the exit volume of the piston rod 6, a small-diameter hole may suffice as the valve hole 34 of the tension stroke check valve V3. Therefore, the outer diameter of the first valve structure 24 may also be set to a small diameter which can be readily applied to the cylinder 3 with a small diameter.

"Compression Stroke"

In FIGS. 1, 2, and 11B, as the piston 5 moves downward and oil inside the piston oil chamber 7 is pressurized, the oil inside the piston oil chamber 7 passes through the valve hole 30, pushes open the valve seat 31, and flows into the valve communicating chamber 29. In other words, the oil passes through the compression stroke damping valve V2 and, accordingly, a compression side damping force is generated in the hydraulic shock absorber 1. Oil corresponding to an entry volume of the piston rod 6 is compensated by flowing into the reservoir chamber 10 via the connecting hole 41. Oil corresponding to an increased volume of the rod oil chamber 8 flows from the valve communicating chamber 29 to the rod oil chamber 8 via the compression stroke check valve V4, the connecting flow channel 46, the notched opening portion 37, the groove 38, the reflux path 9, and the notched flow channel 19.

"Assembly Procedure of Hydraulic Shock Absorber 1"

Figure 13:
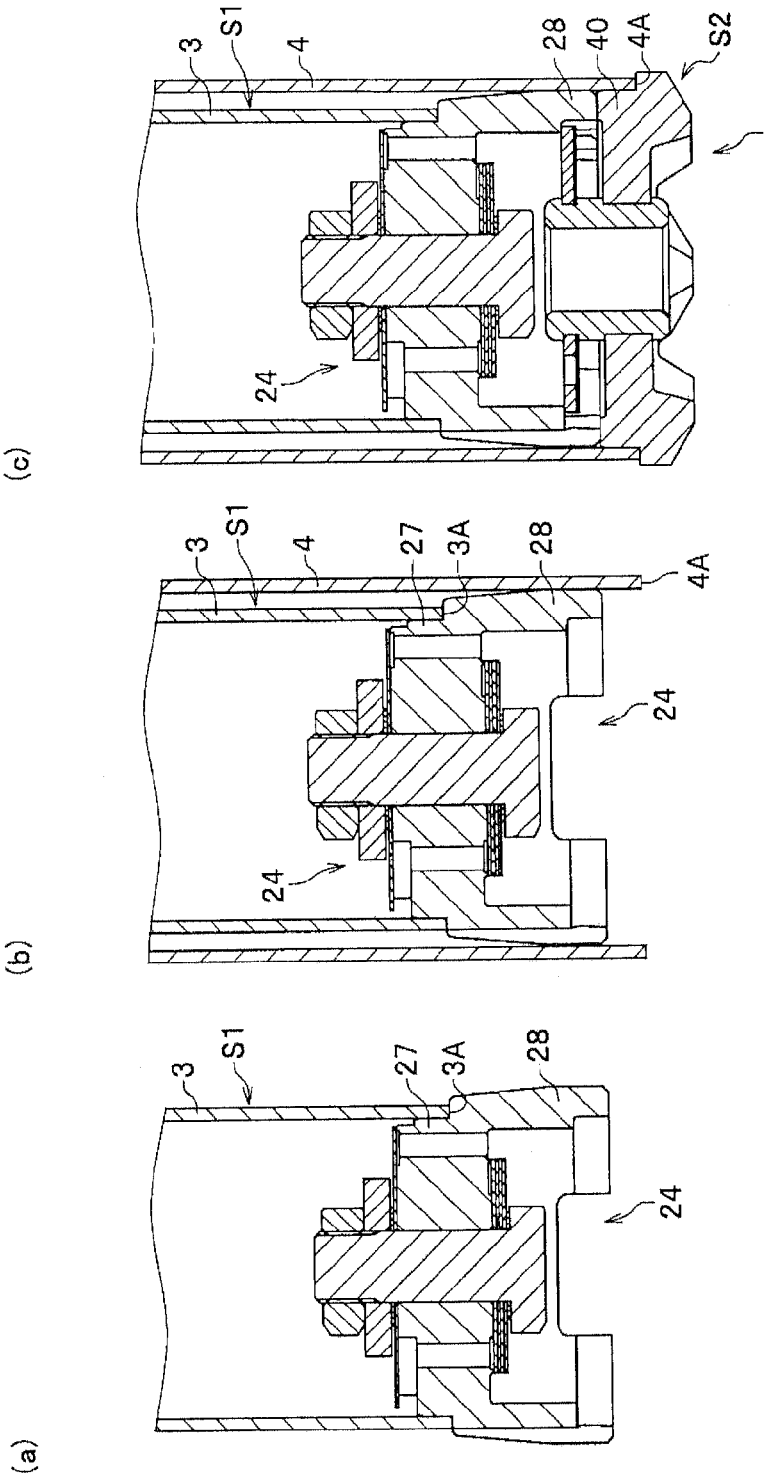
FIG. 13 is an explanatory diagram showing an assembly procedure of a hydraulic shock absorber according to the present invention.

An example of an assembly procedure of the hydraulic shock absorber 1 will be described with reference to FIG. 13. First, by press-fitting the outer circumferential surface of the base portion 27 of the first valve structure 24 around the open end 3A on the side of the other axial end of the cylinder 3, the cylinder assembly S1 which integrates the first valve structure 24 and the cylinder 3 is created (FIG. 13A). Next, the cylinder assembly S1 is inserted into the outer cylinder body 4 (FIG. 13B). Since a maximum outer diameter portion of the skirt portion 28 of the first valve structure 24 is set so as to come into contact with an inner circumferential surface of the outer cylinder body 4 without involving too much contact pressure, insertion of the cylinder assembly S1 into the outer cylinder body 4 can be performed smoothly. Next, the outer circumferential surface of the base portion 40 of the second valve structure 25 is press-fitted around the open end 4A on the side of the other axial end of the outer cylinder body 4 (FIG. 13C). Accordingly, in a state where the cylinder assembly S1 is inserted into the outer cylinder body 4, the outer cylinder assembly S2 which integrates the outer cylinder body 4 and the second valve structure 25 is created.

Next, in FIG. 1, the piston 5 and the piston rod 6 are inserted from the open end on the side of the one axial end of the cylinder 3. At this point, the rod guide 18 has already been mounted to the piston rod 6, and by inserting the piston 5 into the cylinder 3, the piston rod 6 is concentrically positioned relative to the cylinder 3 and the outer cylinder body 4. Therefore, by slidingly moving the rod guide 18 along the piston rod 6 as-is, the rod guide 18 is smoothly press-fitted into the respective open ends on the side of the one axial end of the cylinder 3 and the outer cylinder body 4.

Subsequently, the assembly described above is inserted into the damper case 2, the oil seal 14 and the like are mounted, and a periphery of the opening portion 13 of the damper case 2 is swaged via the end caps 15 and 16. In the hydraulic shock absorber 1 assembled as described above, the cylinder 3 and the outer cylinder body 4 are concentrically positioned around the lower end-side open ends 3A and 4A due to the outer circumference of the hem portion of the skirt portion 28 of the first valve structure 24 abutting the inner circumferential surface of the outer cylinder body 4, and the cylinder 3 and the outer cylinder body 4 are concentrically positioned around the upper end-side open ends by being both press-fitted into the rod guide 18. In addition, relative to the damper case 2, the cylinder 3 and the outer cylinder body 4 are concentrically positioned on the lower end side due to the inclined surface 49 of the protruding portion 47 of the second valve structure 25 coming into contact with the inclined surface 17 of the damper case 2 and being guided toward the shaft center O and are concentrically positioned on the upper end side via the rod guide 18.

As described above, by adopting a structure in which the valve structure 11 is constituted by the first valve structure 24 to be mounted to the open end 3A of the cylinder 3 and the second valve structure 25 to be mounted to the open end 4A of the outer cylinder body 4 and which the cylinder assembly S1 constituted by the cylinder 3 and the first valve structure 24 and the outer cylinder assembly S2 constituted by the outer cylinder body 4 and the second valve structure 25 are provided independent of each other, the cylinder assembly 51 and the outer cylinder assembly S2 can be readily assembled compared to a structure in which the cylinder 3 and the outer cylinder body 4 are mounted to a single valve structure. In doing so, a state of a mounting portion (a press-fit portion) of the cylinder 3 and the first valve structure 24 can be readily comprehended by visual observation, and a state of a mounting portion (a press-fit portion) of the outer cylinder body 4 and the second valve structure 25 can be readily comprehended by visual observation. In addition, an overall assembly constituted by the cylinder 3, the outer cylinder body 4, and the valve structure 11 (the first valve structure 24 and the second valve structure 25) can be readily constructed by merely inserting the cylinder assembly S1 into the outer cylinder assembly S2. Furthermore, since the cylinder assembly S1 and the outer cylinder assembly S2 are provided independent of each other, freedom of design of both assemblies is increased, and a highly versatile hydraulic shock absorber can be realized by, for example, adopting a common specification for one of the assemblies. The expression "the cylinder assembly S1 and the outer cylinder assembly S2 being independent of each other" means that the cylinder assembly S1 and the outer cylinder assembly S2 are arranged between the first valve structure 24 and the second valve structure 25 without having means that directly couples the two assemblies with each other.

Moreover, since the tension stroke damping valve V1 is provided at the piston 5, an amount of oil that passes through the tension stroke check valve V3 during a tension stroke corresponds only to an exit volume of the piston rod 6 and the tension stroke check valve V3 can be set to a small size.

In addition, the present invention is structured such that, a periphery of the open end 3A of the cylinder 3 is concentrically positioned relative to the outer cylinder body 4 due to the outer circumference of the skirt portion 28 of the first valve structure 24 abutting the inner circumference of the outer cylinder body 4 between the open end 3A of the cylinder 3 and the open end 4A of the outer cylinder body 4. In other words, the outer circumference of the first valve structure 24 abuts the inner circumference of the outer cylinder body 4 midway along the reflux path 9. Therefore, no seal member for sealing the abutting portion is required on the outer circumference of the first valve structure 24. Accordingly, the periphery of the open end 3A of the cylinder 3 can be concentrically positioned relative to the outer cylinder body 4 with a simple structure.

Second Embodiment

Figure 5:
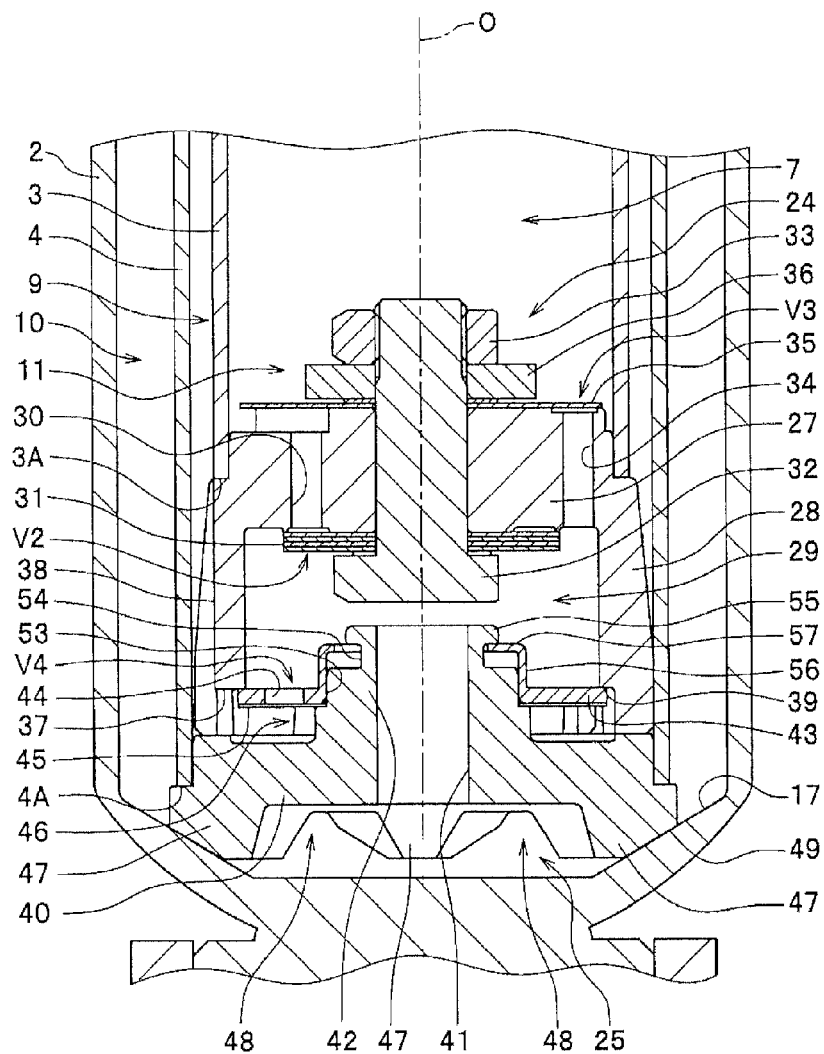
FIG. 5 is an enlarged explanatory diagram of a periphery of a valve structure according to a second embodiment of the present invention.
Figure 6:
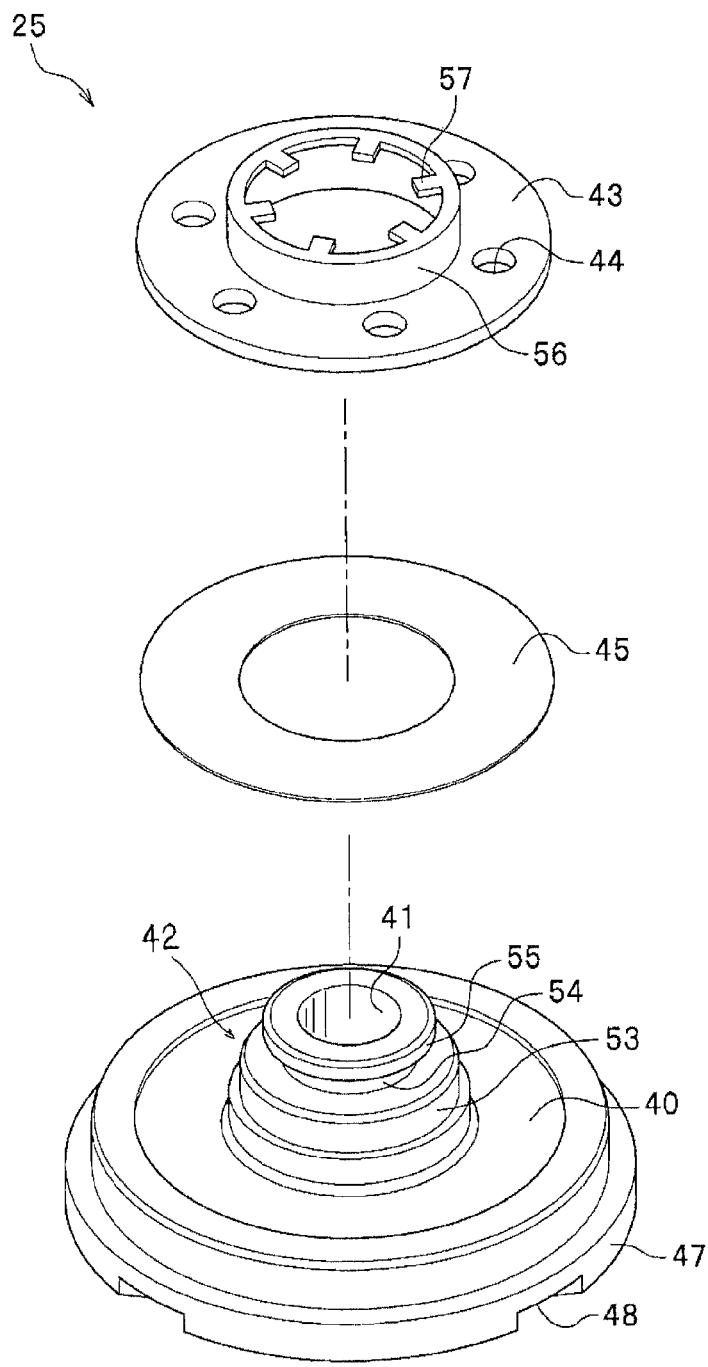
FIG. 6 is an exploded perspective view of a second valve structure according to the second embodiment of the present invention.

A second embodiment will now be described with reference to FIGS. 5 and 6. In the present embodiment, components similar to those of the first embodiment will be denoted by similar reference numerals and a description thereof will be omitted.

The second embodiment differs from the first embodiment in a component structure of the second valve structure 25. Compared to the first embodiment adopting three members manufactured independent of each other as the base portion 40, the cylindrical protruding portion 42, and the cylinder supporting plate portion 43, the base portion 40 and the cylindrical protruding portion 42 are constituted by an integrally-molded member in the second embodiment.

The cylindrical protruding portion 42 has a middle-diameter portion 53 and a small-diameter portion 54 formed above the middle-diameter portion 53, and an engaging flange portion 55 having a diameter larger than that of the small-diameter portion 54 is formed above the small-diameter portion 54 at an upper end of the cylindrical protruding portion 42. Meanwhile, a rising wall portion 56 which rises upward is formed on an inner circumferential edge of the cylinder supporting plate portion 43, and a plurality of engaging pawl portions 57 is provided at an upper end of the rising wall portion 56 so as to protrude in a radial direction at intervals in a circumferential direction.

Accordingly, respective through holes of a valve seat 45 and the cylinder supporting plate portion 43 are passed through the middle-diameter portion 53 of the cylindrical protruding portion 42, and by press-fitting the rising wall portion 56 into the middle-diameter portion 53, the cylinder supporting plate portion 43 is fixed to the cylindrical protruding portion 42. During press-fitting, the engaging pawl portion 57 elastically deforms to pass through the engaging flange portion 55. Upon completion of press-fitting of the rising wall portion 56, the engaging pawl portion 57 is restored and engages a lower end of the engaging flange portion 55 as shown in FIG. 5 to prevent detachment of the cylinder supporting plate portion 43 relative to the cylindrical protruding portion 42. According to the present embodiment, by configuring the base portion 40 and the cylindrical protruding portion 42 as an integrally-molded member and further eliminating the need of riveting, an assembly operation of the second valve structure 25 can be simplified.

Operations regarding the flow of oil during a tension stroke and a compression stroke and an assembly procedure of the entire hydraulic shock absorber 1 are similar to those of the first embodiment.

Third Embodiment

Figure 7:
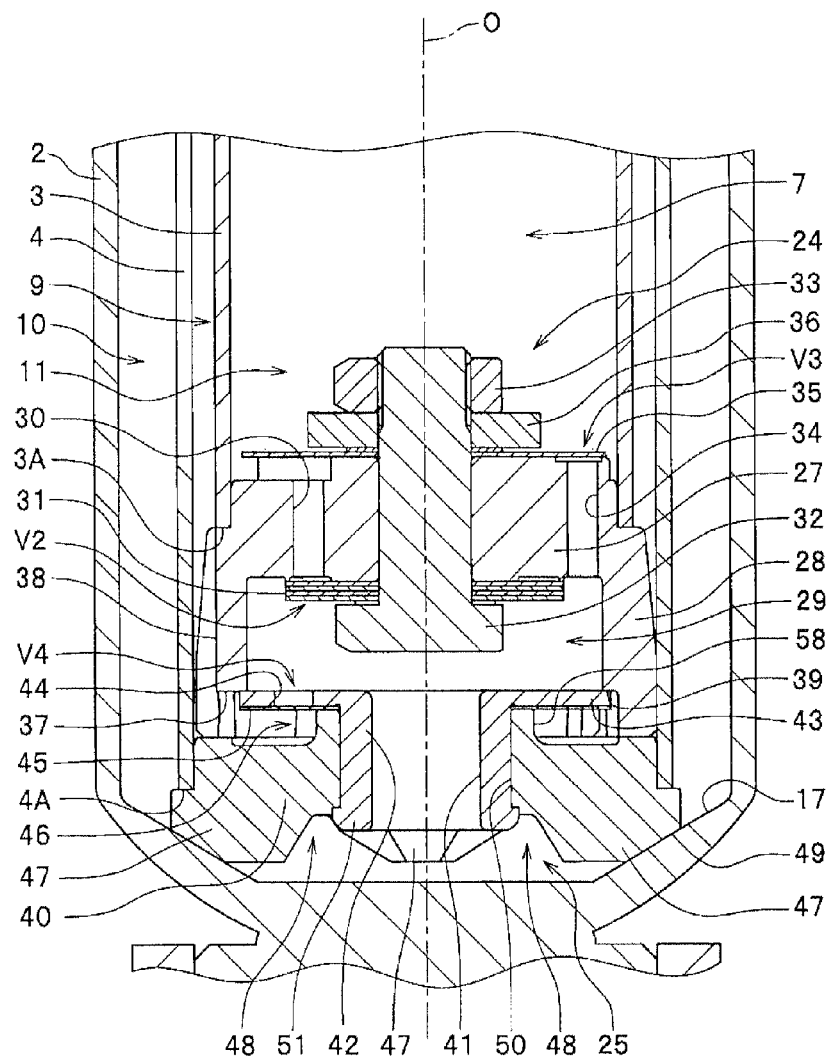
FIG. 7 is an enlarged explanatory diagram of a periphery of a valve structure according to a third embodiment of the present invention.
Figure 8:
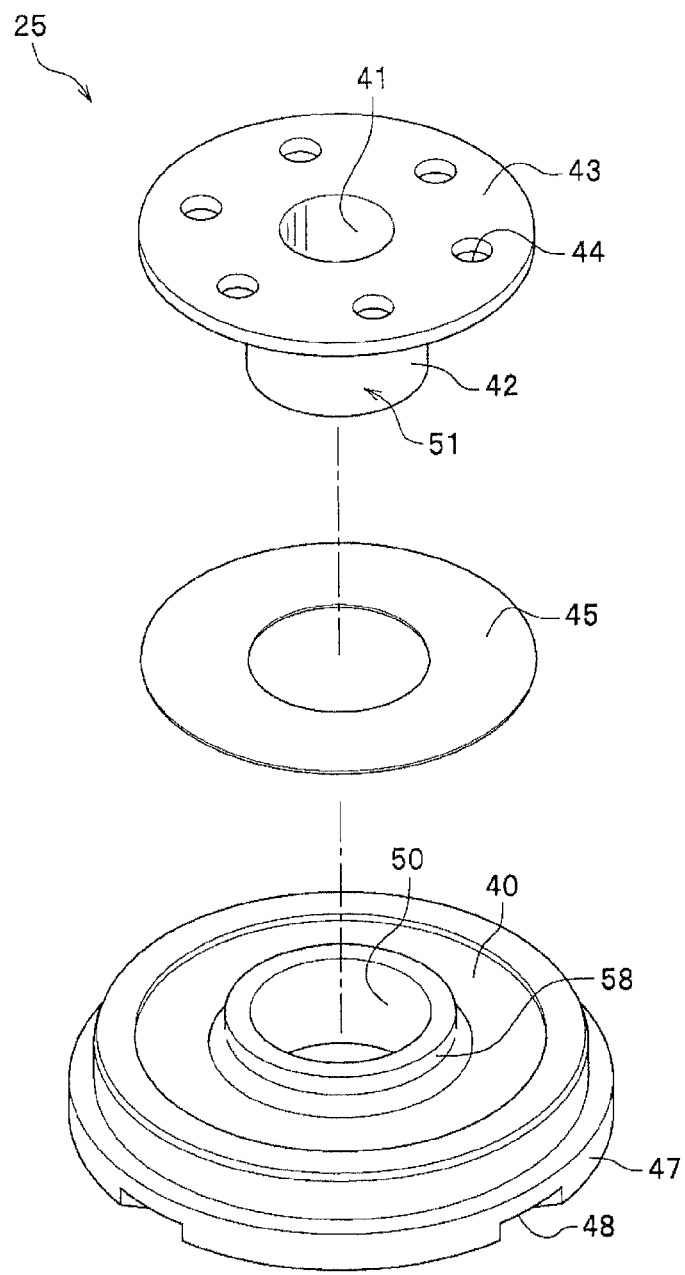
FIG. 8 is an exploded perspective view of a second valve structure according to the third embodiment of the present invention.

A third embodiment will now be described with reference to FIGS. 7 and 8. In the present embodiment, components similar to those of the first embodiment will be denoted by similar reference numerals and a description thereof will be omitted.

The third embodiment similarly differs from the first embodiment in a component structure of the second valve structure 25. Compared to the first embodiment adopting three members manufactured independent of each other as the base portion 40, the cylindrical protruding portion 42, and the cylinder supporting plate portion 43, the cylindrical protruding portion 42 and the cylinder supporting plate portion 43 are constituted by an integrally-molded member in the third embodiment.

A cylindrical shaft 51 constituting the cylindrical protruding portion 42 is inserted into a through hole 50 of the base portion 40 and a lower end of the cylindrical shaft 51 is fixed to a lower surface of the base portion 40 by riveting or the like. A supporting protruding portion 58 is provided so as to protrude around the through hole 50 on an upper surface of the base portion 40, and an inner circumferential edge of a valve seat 45 is sandwiched between the supporting protruding portion 58 and the cylinder supporting plate portion 43. According to the present embodiment, by configuring the cylindrical protruding portion 42 and the cylinder supporting plate portion 43 as an integrally-molded member, an assembly operation of the second valve structure 25 can be simplified.

Operations regarding the flow of oil during a tension stroke and a compression stroke and an assembly procedure of the entire hydraulic shock absorber 1 are similar to those of the first embodiment.

Fourth Embodiment

A fourth embodiment will now be described with reference to FIGS. 9 and 10. In the present embodiment, components similar to those of the first embodiment will be denoted by similar reference numerals and a description thereof will be omitted.

While the first to third embodiments are modes in which the tension stroke damping valve V1 is provided on the piston 5, the fourth embodiment is a mode in which the tension stroke damping valve V1 is provided on the second valve structure 25. In other words, in the fourth embodiment, the compression stroke damping valve V2 and the tension stroke check valve V3 are provided on the first valve structure 24 while the tension stroke damping valve V1 and the compression stroke check valve V4 are provided on the second valve structure 25. No valve that connects a piston oil chamber 7 and a rod oil chamber 8 with each other is provided on the piston 5.

The second valve structure 25 according to the present embodiment is also constituted by a shape having a disk-like base portion 40 which is press-fitted into an inner circumference of an open end 4A of the outer cylinder body 4 to block the open end 4A, a cylindrical protruding portion 42 which protrudes from the base portion 40 to a valve communicating chamber 29 and which includes therein a connecting hole 41 that connects the valve communicating chamber 29 and the reservoir chamber 10 with each other, and a cylinder supporting plate portion 43 which is provided so as to extend radially outward from the cylindrical protruding portion 42. However, the cylinder supporting plate portion 43 according to the present embodiment does not butt against an uneven surface 39.

In the present embodiment, the cylindrical protruding portion 42 is constituted by a bolt 59 and a connecting hole 41 is bored through center of the bolt 59. A supporting protruding portion 63 is provided so as to protrude around the through hole 50 on an upper surface of the base portion 40. The disk-like cylinder supporting plate portion 43 is placed on the supporting protruding portion 63, and the bolt 59 is inserted through a through hole of the cylinder supporting plate portion 43 and the through hole 50 of the base portion 40 and fastened and fixed by a nut 60 on a lower surface of the base portion 40.

The tension stroke damping valve V1 is a throttle valve that throttles a flow of oil from a connecting flow channel 46 (a reflux path 9) to the valve communicating chamber 29, and is constituted by a valve hole 61 which is formed so as to penetrate the cylinder supporting plate portion 43 along a shaft center O and which connects the connecting flow channel 46 and the valve communicating chamber 29 with each other and a plurality of annular valve seats 62 which is supported by a shaft portion of the bolt 59 in the valve communicating chamber 29 and which opens and closes the valve hole 61. A degree of opening of the valve seat 62 is restricted by a head portion of the bolt 59. The valve hole 61 is positioned radially inward relative to a valve hole 44 of the compression stroke check valve V4. Reference numeral 64 denotes a washer that is interposed between the head portion of the bolt 59 and the valve seat 62.

"Operation"

Figure 12:
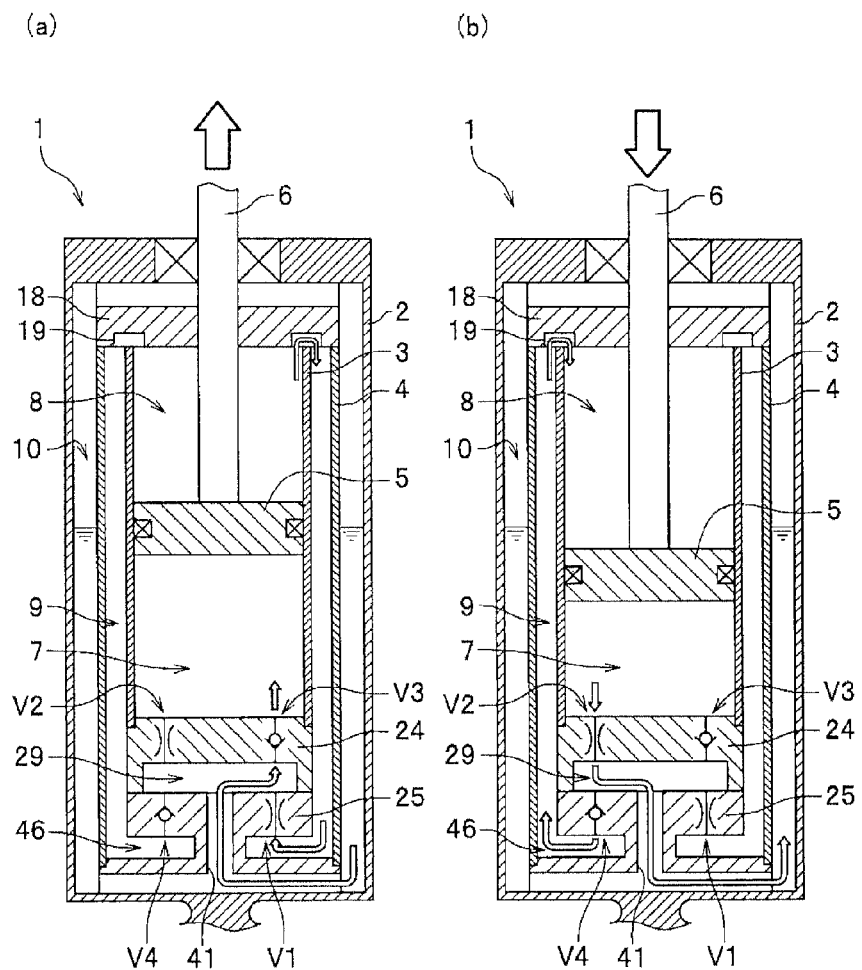
FIG. 12 is a simplified view of a structure of a hydraulic shock absorber according to the fourth embodiment showing respective valves encoded, in which FIGS. 12A and 12B respectively show a flow of oil during a tension stroke and a compression stroke.

An operation of the hydraulic shock absorber 1 according to the fourth embodiment will now be described. FIG. 12 is a simplified view of a structure of the hydraulic shock absorber 1 according to the fourth embodiment showing respective valves encoded, in which FIGS. 12A and 12B respectively show a flow of oil during a tension stroke and a compression stroke. The following description will be given with reference to FIGS. 9, 10, and 12 as appropriate.

"Tension Stroke"

Figure 9:
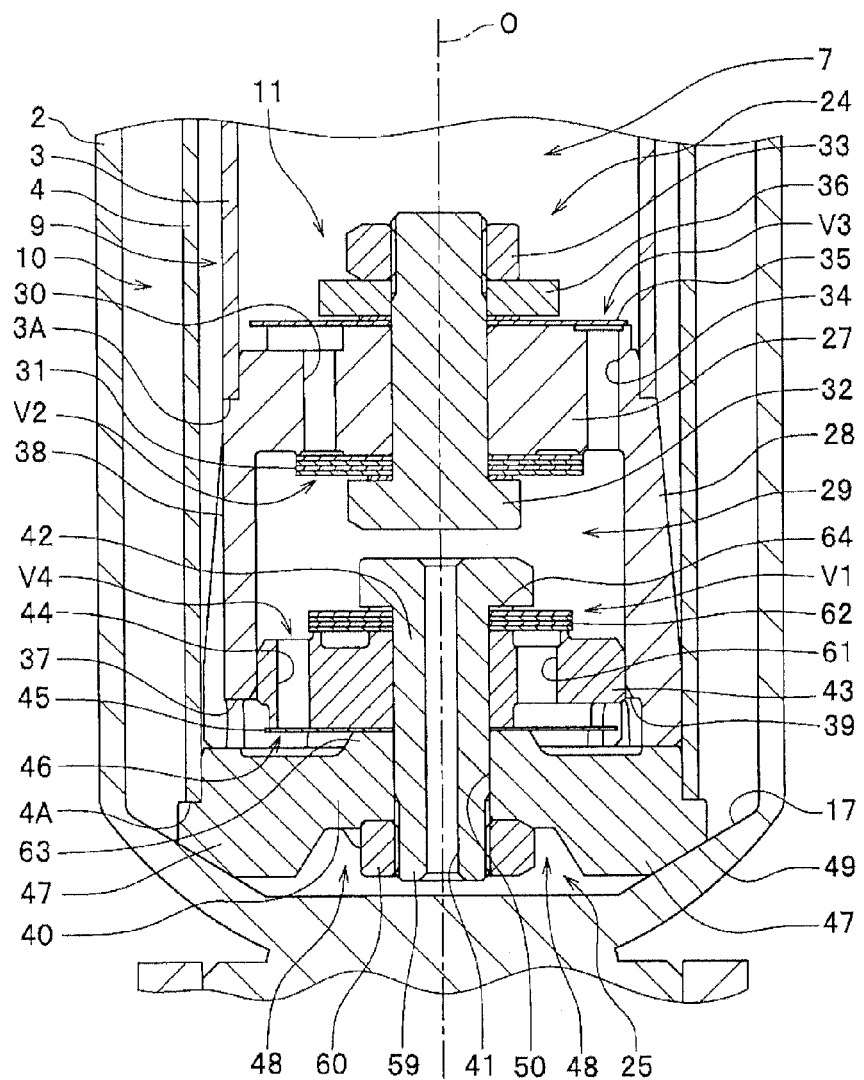
FIG. 9 is an enlarged explanatory diagram of a periphery of a valve structure according to a fourth embodiment of the present invention.
Figure 10:
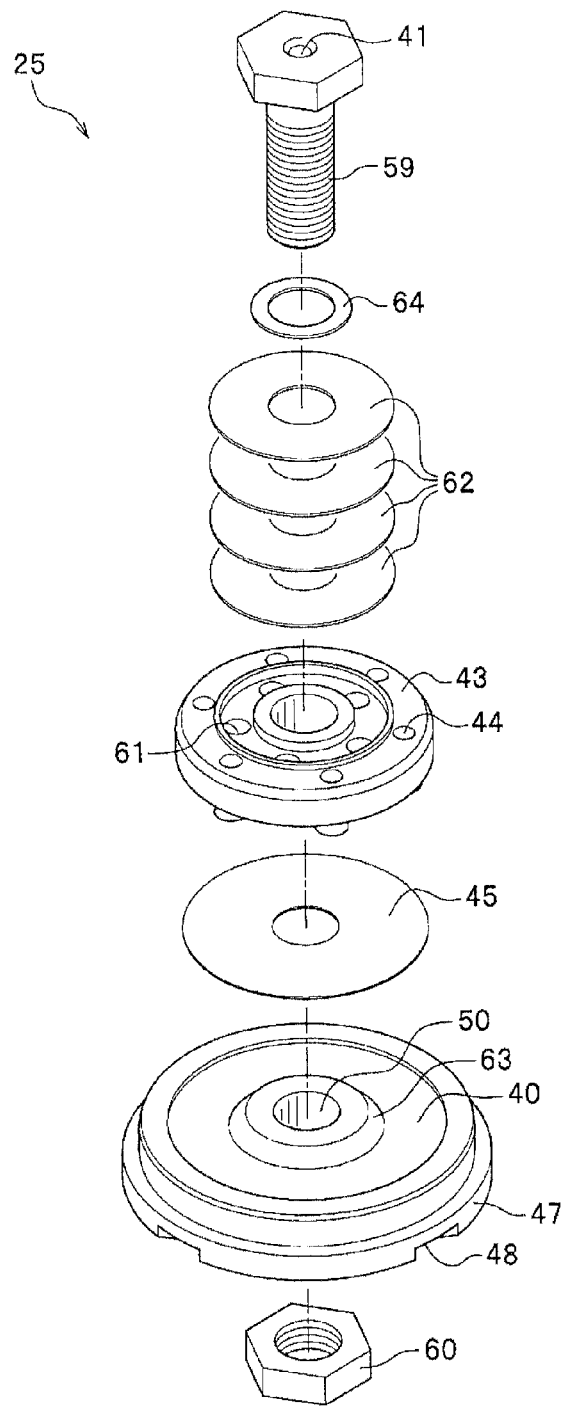
FIG. 10 is an exploded perspective view of a second valve structure according to the fourth embodiment of the present invention.

In FIGS. 9, 10, and 12A, as the piston 5 moves upward and oil inside the rod oil chamber 8 is pressurized, the oil inside the rod oil chamber 8 flows along the notched flow channel 19 and flows to the reflux path 9. In correspondence with an increase of volume of the piston oil chamber 7, oil flows from the reflux path 9, passes through the tension stroke damping valve V1, flows into the valve communicating chamber 29, passes through the tension stroke check valve V3, and flows into the piston oil chamber 7. As the oil passes through the tension stroke damping valve V1, a tension side damping force is generated in the hydraulic shock absorber 1. Oil corresponding to an exit volume of the piston rod 6 is compensated by being supplied from the reservoir chamber 10 to the piston oil chamber 7 via the connecting hole 41, the valve communicating chamber 29, and the tension stroke check valve V3.

"Compression Stroke"

In FIGS. 9, 10, and 12B, as the piston 5 moves downward and oil inside the piston oil chamber 7 is pressurized, the oil inside the piston oil chamber 7 passes through the valve hole 30, pushes open the valve seat 31, and flows into the valve communicating chamber 29. In other words, the oil passes through the compression stroke damping valve V2 and, accordingly, a compression side damping force is generated in the hydraulic shock absorber 1. Oil corresponding to an entry volume of the piston rod 6 is compensated by flowing into the reservoir chamber 10 via the connecting hole 41. Oil of the rod oil chamber 8 flows from the valve communicating chamber 29 to the rod oil chamber 8 via the compression stroke check valve V4, the connecting flow channel 46, the notched opening portion 37, the groove 38, the reflux path 9, and the notched flow channel 19.

As described above, with the hydraulic shock absorber 1 according to the fourth embodiment, since a damping valve and a check valve can be aggregated on the side of the valve structure 11 without having to provide a damping valve on the piston 5, the hydraulic shock absorber 1 with a simple structure can be realized.

Moreover, an assembly procedure of the entire hydraulic shock absorber 1 is approximately similar to that of the first embodiment.

While suitable embodiments of a hydraulic shock absorber according to the present invention have been described, it is to be understood that the present invention is not limited to the embodiments illustrated in the drawings and that the present invention covers all design changes which do not constitute departures from the spirit and scope of the present invention.

EXPLANATION OF REFERENCE NUMERALS 1 hydraulic shock absorber
2 damper case
3 cylinder
3A open end
4 outer cylinder body
4A open end
5 piston
6 piston rod
7 piston oil chamber
8 rod oil chamber
9 reflux path
10 reservoir chamber
11 valve structure
24 first valve structure
25 second valve structure
29 valve communicating chamber
40 base portion
41 connecting hole
42 cylindrical protruding portion
43 cylinder supporting plate portion
46 connecting flow channel
S1 cylinder assembly
S2 outer cylinder assembly
V1 tension stroke damping valve
V2 compression stroke damping valve
V3 tension stroke check valve
V4 compression stroke check valve

What is claimed is:

1. A hydraulic shock absorber comprising, inside a cylindrical damper case:
   a cylinder which demarcates a piston oil chamber and a rod oil chamber so as to sandwich a piston;
   an outer cylinder body which is arranged outside the cylinder, said outer cylinder body demarcating a reflux path between it and the cylinder and demarcating a reservoir chamber between it and the damper case; and
   a valve structure which is mounted to each open end of the cylinder and the outer cylinder body on the side of the piston oil chamber and which is provided with a valve for controlling a flow of oil between the piston oil chamber and the reflux path and between the piston oil chamber and the reservoir chamber, wherein
   the reflux path connects the piston oil chamber and the rod oil chamber with each other,
   the reservoir chamber compensates for oil corresponding to tension and compression of a piston rod,
   the valve structure is constituted by a first valve structure to be mounted to the open end of the cylinder and a second valve structure to be mounted to the open end of the outer cylinder body,
   the first valve structure includes a skirt portion that abuts the outer cylinder body and a base portion of the second valve structure, and
   a cylinder assembly constituted by the cylinder and the first valve structure and an outer cylinder assembly constituted by the outer cylinder body and the second valve structure are independent of each other.

2. The hydraulic shock absorber according to claim 1, wherein the piston includes a tension stroke damping valve, the first valve structure includes a compression stroke damping valve and a tension stroke check valve, and the second valve structure includes a compression stroke check valve.

3. The hydraulic shock absorber according to claim 1, wherein the first valve structure includes a compression stroke damping valve and a tension stroke check valve, and the second valve structure includes a tension stroke damping valve and a compression stroke check valve.

4. The hydraulic shock absorber according to claim 2, wherein a valve communicating chamber is formed between the first valve structure and the second valve structure, the base portion being fitted to the open end of the outer cylinder body, a cylindrical protruding portion which protrudes from the base portion to the valve communicating chamber and which includes therein a connecting hole that connects the valve communicating chamber and the reservoir chamber with each other, and an annular cylinder supporting plate portion which extends radially outward from the cylindrical protruding portion and the outer edge of which butts against an uneven surface of an inner circumference of the first valve structure in an axial direction, and the compression stroke check valve is constituted by a valve hole which is formed so as to penetrate the cylinder supporting plate portion, and an annular valve seat which is supported by the cylindrical protruding portion and which opens and closes the valve hole.

5. The hydraulic shock absorber according to claim 1, wherein an outer circumference of the first valve structure abuts a side of an inner circumference of the outer cylinder body between the open end of the cylinder and the open end of the outer cylinder body, to concentrically position a periphery of the open end of the cylinder relative to the outer cylinder body.

6. The hydraulic shock absorber according to claim 2, wherein an outer circumference of the first valve structure abuts a side of an inner circumference of the outer cylinder body between the open end of the cylinder and the open end of the outer cylinder body, to concentrically position a periphery of the open end of the cylinder relative to the outer cylinder body.

7. The hydraulic shock absorber according to claim 3, wherein an outer circumference of the first valve structure abuts an inner circumference of the outer cylinder body between the open end of the cylinder and the open end of the outer cylinder body, to concentrically position a periphery of the open end of the cylinder relative to the outer cylinder body.

8. The hydraulic shock absorber according to claim 4, wherein an outer circumference of the first valve structure abuts a side of an inner circumference of the outer cylinder body between the open end of the cylinder and the open end of the outer cylinder body, to concentrically position a periphery of the open end of the cylinder relative to the outer cylinder body.

9. The hydraulic shock absorber according to claim 1, wherein the second valve structure is press-fitted into the outer cylinder body.

10. The hydraulic shock absorber according to claim 1, wherein the cylinder assembly is inserted into the outer cylinder assembly.

11. The hydraulic shock absorber according to claim 1, wherein the skirt portion has an internal space formed between the first valve structure and the second valve structure.

12. The hydraulic shock absorber according to claim 1, wherein an outer circumferential surface of the skirt portion abuts an inner circumferential surface of a side wall of the outer cylinder body.

13. The hydraulic shock absorber according to claim 1, wherein the outer cylinder body is spaced from the cylinder along its entire length.

* * * * *